United States Patent
Ortega

(10) Patent No.: US 9,868,924 B1
(45) Date of Patent: Jan. 16, 2018

(54) COMPOSITION AND METHOD

(71) Applicant: Pilar Ortega, Rancho Palos Verdes, CA (US)

(72) Inventor: Pilar Ortega, Rancho Palos Verdes, CA (US)

(73) Assignee: INTERNATIONAL TECHNOLOGIES AND SERVICES, INC., San Pedro, CA (US)

( * ) Notice: Subject to any disclaimer, the term of this patent is extended or adjusted under 35 U.S.C. 154(b) by 0 days.

(21) Appl. No.: 14/706,612

(22) Filed: May 7, 2015

Related U.S. Application Data

(60) Provisional application No. 62/006,582, filed on Jun. 2, 2014.

(51) Int. Cl.
| | | |
|---|---|---|
| *C11D 3/37* | (2006.01) | |
| *C11D 1/12* | (2006.01) | |
| *C11D 3/22* | (2006.01) | |
| *C11D 3/20* | (2006.01) | |
| *C11D 3/30* | (2006.01) | |

(52) U.S. Cl.
CPC .............. *C11D 1/12* (2013.01); *C11D 3/2017* (2013.01); *C11D 3/2068* (2013.01); *C11D 3/2096* (2013.01); *C11D 3/221* (2013.01); *C11D 3/30* (2013.01)

(58) Field of Classification Search
CPC .................................................. C11D 3/3757
USPC ........................................................ 510/476
See application file for complete search history.

(56) References Cited

U.S. PATENT DOCUMENTS

| | | | |
|---|---|---|---|
| 5,302,320 A | | 4/1994 | Hosmer et al. |
| 5,776,257 A | | 7/1998 | Arnold et al. |
| 5,922,667 A | * | 7/1999 | van Baggem et al. ....... 510/403 |
| 6,069,002 A | | 5/2000 | Powell, Jr. |
| 6,087,317 A | * | 7/2000 | Gee ............................... 510/417 |
| 6,165,965 A | * | 12/2000 | Schalitz et al. ............... 510/384 |
| 6,180,584 B1 | * | 1/2001 | Sawan .................... A01N 25/10 510/131 |
| 6,180,585 B1 | * | 1/2001 | Schalitz ................. A01N 63/00 510/195 |
| 7,637,271 B1 | * | 12/2009 | Cumberland et al. ....... 134/25.2 |
| 7,840,366 B1 | | 11/2010 | Moses et al. |
| 2004/0234486 A1 | * | 11/2004 | Hashimoto ................. 424/70.16 |
| 2005/0123560 A1 | * | 6/2005 | Sinnott ..................... 424/195.18 |
| 2007/0241306 A1 | * | 10/2007 | Wehner et al. .................. 252/67 |
| 2011/0069114 A1 | * | 3/2011 | Ikoshi et al. ..................... 347/28 |

OTHER PUBLICATIONS

Akzo Nobel, Technical Information, 2005.*
U.S. Appl. No. 12/540,229, filed Mar. 9, 2012, Office action.
U.S. Appl. No. 12/540,229, filed Dec. 5, 2012, Office action.
U.S. Appl. No. 13/943,890, filed Jul. 2, 2015, Office action.
Cassinis: Microbail Water Treatment: An Alternative Treatment to Manage Sulfate Reducing Bacteria (SRB) Activity, Corrosion, Scale, Oxygen, and Oil Carry-Over at Wilmington CA.
Mysels, Karol, J: Introduction to Colloid Chemistry, 1964, Interscience Publishers, Inc. New York, Div. of John Wiley & Sons, New York.
International Technologies and Services: Your Waste Is Your Responsibility From Cradle to Grave, booklet, Jul. 2003.
Rule 1149. Storage Tank and Pipeline Cleaning and Degassing, p. 1-6, Adopted Dec. 4, 1987, Amended Apr. 1, 1988, Jul. 14, 1995, May 2, 2008.
Preliminary Draft/Staff Report Proposed Amended Rule 1149. Storage Tank and Pipeline Cleaning and Degassing, Dec. 2007.

* cited by examiner

*Primary Examiner* — Nicole M Buie-Hatcher
*Assistant Examiner* — M. Reza Asdjodi
(74) *Attorney, Agent, or Firm* — John J. Connors; Connors & Assoc. pc

(57) ABSTRACT

An aqueous composition comprising a blend of surfactants including (a) a mixture of C6 alkyl glucoside, propylheptanol, and ethoxylate, (b) sorbitan monooleate, (c) polyoxyethylene sorbitan monooleate, (d) trietanolamine, and (e) sodium ether sulfate.

3 Claims, No Drawings

COMPOSITION AND METHOD

RELATED PATENT APPLICATIONS & INCORPORATION BY REFERENCE

This utility application claims the benefit under 35 USC 119(e) of U.S. Provisional Patent Application No. 62/006,562, entitled "Composition and Method," filed Jun. 2, 2014. This related application is incorporated herein by reference and made a part of this application. If any conflict arises between the disclosure of the invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

SUMMARY

My composition is a water-based product comprising a blend of surfactants that is originally manufactured as a concentrate and then diluted with water in different amounts to form products tailored for different applications.

The blend of surfactants includes
 (a) a mixture of C6 alkyl glucoside, propylheptanol, and ethoxylate,
 (b) sorbitan monolaurate,
 (c) polyoxyethylene sorbitan monolaurate,
 (d) trietanolamine,
 (e) sodium ether sulfate.

The mixture of C6 alkyl glucoside, propylheptanol, and ethoxylate is sold under the trademark Berol EZ® 1 by AKZONOBEL (www.akzonobel.com) and comprises from 1 to 4 weight percent of the blend. The sorbitan monolaurate comprises from 0.1 to 5 weight percent of the blend. The polyoxyethylene sorbitan monolaurate comprises from 1.0 to 8 weight percent of the blend. The trietanolamine comprises from 0.5 to 2 weight percent of the blend. The sodium ether sulfate comprises from 1.0 to 3 weight percent of the blend. And the balance of the blend comprises water.

The above mixture of surfactants is a concentrated product that is diluted for specific applications. According to my method of making an aqueous cleaning product one part of the composition of claim 1 is added to from 86 to 98 parts water to provide a diluted product. Depending on the concentration, these applications, include, but are not limited to, a glass cleaner product, a precision metal parts cleaner, and a multipurpose cleaner. My concentrated composition is diluted with water where one part of the composition is added to from 92 to 98 parts of water to form a glass cleaner product. My concentrated composition is diluted with water where one part of the composition is added to from 96 to 98 parts of water to form a precision metal parts cleaner. My concentrated composition is diluted with water where one part of the composition is added to from 86 to 90 parts of water to form to form a multipurpose cleaner.

My composition may be used with or without microbes depending on the application, and in particular aerobic microorganisms that feed on contamination are especially useful in some circumstances. My concentrated composition has insignificant amounts of volatile organic compounds (VOC) to be as green as possible, and specifically has less than 10 grams per liter of volatile organic compounds in the composition. The water used to dilute the concentrated formula, however, may have volatile organic compounds depending on the source of the water when being diluted by purchasers of the concentrated formula. By diluting the concentrated solution with water different products are provided for many different applications such as, for example, cleaning of metal and plastic surfaces, cleaning glass, hand washing, removing grease in industrial environments, and cleaning aircraft and precision parts All the ingredients may be biodegradable, non-toxic, non-caustic, nonflammable, non-abrasive. My concentrate composition and diluted products made therefrom degrease as they clean, cutting through grease, grime and window film without streaking, are safe for workers and the environment, do not required personal protective equipment, clean without caustic burning action, and are low foaming. My composition need not contain an added fragrance or volatile organic ingredients that can adversely impact indoor air quality, isn't an alcohol and is an ammonia-free solution, is safe for use with most leathers, removes sticky glues, and is safe to use in carpet cleaner equipment. My concentrated composition has been tested and certified as a clean air solvent by the South Coast Air Quality Management District in Orange County, Calif.

The following formula is a concentrate that is diluted with water to make products for use in different applications.

FORMULA I (Concentrate)

(a) 12 weight percent a mixture of C6 alkyl glucoside, propylheptanol, and ethoxylate,
 (b) 3 weight percent sorbitan monolaurate
 (c) 8 weight percent polyoxyethylene sorbitan monolaurate
 (d) 2 weight percent triethanolamine
 (e) 3 weight percent sodium ether sulfate, and
 (f) 72 weight percent water.

EXAMPLE 1

Glass Cleaner

One (1) part of FORMULA I was added to 99 parts of water a mixed to form a glass cleaner.

EXAMPLE 2

Precision Metal Parts Cleaner

Two (2) parts of FORMULA I was added to 98 parts of water a mixed to form a precision metal parts cleaner.

EXAMPLE 3

Multipurpose Cleaner

Four (4) parts of FORMULA I was added to 96 parts of water a mixed to form a multipurpose cleaner.

SCOPE OF THE INVENTION

The above presents a description of the best mode I contemplate of carrying out my composition and method, and of the manner and process of making and using them, in such full, clear, concise, and exact terms as to enable a person skilled in the art to make and use. My composition and method are, however, susceptible to modifications and alternate constructions from the illustrative embodiments discussed above which are fully equivalent. Consequently, it is not the intention to limit my composition and method to the particular embodiments disclosed. On the contrary, my intention is to cover all modifications and alternate constructions coming within the spirit and scope of my composition and method as generally expressed by the following claims, which particularly point out and distinctly claim the subject matter of my invention:

The invention claimed is:

1. An aqueous degreaser product comprising a mixture of at least the following ingredients:
   (i) aerobic microorganisms and
   (ii) a blend of surfactants comprising (a) a mixture of C6 alkyl glucoside, propylheptanol, and ethoxylate, (b) sorbitan monooleate, (c) polyoxyethylene sorbitan monooleate, (d) trietanolamine, and (e) sodium ether sulfate,
   said mixture of C6 alkyl glucoside, propylheptanol, and ethoxylate comprising from 1 to weight percent of the blend,
   said sorbitan monooleate comprising from 0.1 to 5 weight percent of the blend,
   said polyoxyethylene sorbitan monooleate comprising from 1 to 8 weight percent of the blend,
   said trietanolamine comprising from 0.1 to 5 weight percent of the blend, the sodium ether sulfate comprises from 1 to 3 weight percent of the blend,
   all the ingredients of said aqueous degreaser product being biodegradable, non-toxic, non-caustic, nonflammable, non-abrasive, and non-alcohol, and
   said aqueous degreaser product having less than 10 grams per liter of volatile organic compounds.

2. The aqueous degreaser product of claim 1 where said product is an ammonia-free solution.

3. The aqueous degreaser product of claim 2 where said product meets the clean air solvent standards of the South Coast Air Quality Management District in Orange County, Calif.

* * * * *